(12) United States Patent
Batra

(10) Patent No.: US 7,532,610 B2
(45) Date of Patent: *May 12, 2009

(54) STRUCTURED ADAPTIVE FREQUENCY HOPPING

(75) Inventor: Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1170 days.

This patent is subject to a terminal disclaimer.

(21) Appl. No.: 10/241,298

(22) Filed: Sep. 10, 2002

(65) Prior Publication Data

US 2003/0058829 A1 Mar. 27, 2003

Related U.S. Application Data

(63) Continuation-in-part of application No. 10/003,864, filed on Nov. 2, 2001, now Pat. No. 7,236,511.

(60) Provisional application No. 60/262,006, filed on Jan. 16, 2001, provisional application No. 60/318,841, filed on Sep. 11, 2001.

(51) Int. Cl.
*H04B 7/212* (2006.01)

(52) U.S. Cl. ............... 370/348; 370/322; 370/341; 370/302; 370/337

(58) Field of Classification Search ............ 370/443, 370/345, 343, 132, 337, 348, 322, 341, 302; 375/133

See application file for complete search history.

(56) References Cited

U.S. PATENT DOCUMENTS

| | | | |
|---|---|---|---|
| 4,716,573 A | 12/1987 | Bergstrom et al. | |
| 4,780,885 A | 10/1988 | Paul et al. | |
| 5,323,447 A | 6/1994 | Gillis et al. | |
| 5,333,153 A | 7/1994 | Brown et al. | |
| 5,781,582 A | 7/1998 | Sage et al. | |
| 5,809,059 A | 9/1998 | Souissi et al. | |
| 5,848,095 A | 12/1998 | Deutsch | |
| 6,704,346 B1 * | 3/2004 | Mansfield | 375/136 |
| 6,711,151 B1 * | 3/2004 | Ziegler | 370/350 |
| 6,754,250 B2 * | 6/2004 | Haartsen | 375/132 |

(Continued)

FOREIGN PATENT DOCUMENTS

WO 9610300 4/1996

(Continued)

OTHER PUBLICATIONS

Office Action dated Jan. 31, 2006 for U.S. Appl. No. 10/263,520.

(Continued)

*Primary Examiner*—Ricky Ngo
*Assistant Examiner*—Dewanda Samuel
(74) *Attorney, Agent, or Firm*—Steven A. Shaw; W. James Brady; Frederick J. Telecky, Jr.

(57) ABSTRACT

Embodiments of the invention reduces the computational complexity of adaptive frequency hopping mechanisms while mitigating the effects of interference. Embodiments of the invention can provide structured adapted hopping sequences that reduce transitions between good and bad channels and/or assign good channels to slots where data is to be transmitted and bad channels to idle slots. Embodiments of the can be designed to comply with current FCC regulations, yet remain adaptable to changing rules.

16 Claims, 10 Drawing Sheets

U.S. PATENT DOCUMENTS

| | | |
|---|---|---|
| 7,027,418 B2 * | 4/2006 | Gan et al. .................. 370/329 |
| 7,068,702 B2 * | 6/2006 | Chen et al. ................. 375/132 |
| 7,092,428 B2 * | 8/2006 | Chen et al. ................. 375/132 |
| 7,116,699 B2 | 10/2006 | Batra et al. |
| 7,142,581 B2 * | 11/2006 | Khayrallah et al. ......... 375/133 |
| 7,236,511 B2 | 6/2007 | Batra et al. |
| 7,411,926 B2 | 8/2008 | Batra et al. |
| 2002/0122462 A1 | 9/2002 | Batra et al. |
| 2002/0136268 A1 | 9/2002 | Gan et al. |
| 2003/0058829 A1 | 3/2003 | Batra et al. |
| 2003/0081654 A1 | 5/2003 | Cookley et al. |
| 2003/0086406 A1 | 5/2003 | Batra et al. |
| 2003/0147453 A1 | 8/2003 | Batra et al. |
| 2003/0178984 A1 | 9/2003 | Lansford et al. |

FOREIGN PATENT DOCUMENTS

| | | |
|---|---|---|
| WO | 0129984 | 4/2001 |
| WO | 9938344 | 5/2007 |

OTHER PUBLICATIONS

Final Office Action dated May 18, 2006 for U.S. Appl. No. 10/263,520.

Office Action dated Apr. 27, 2007 for U.S. Appl. No. 10/263,520.

Office Action dated Nov. 21, 2007 for U.S. Appl. No. 10/263,520.

Final Office Action dated Apr. 7, 2008 for U.S. Appl. No. 10/263,520.

* cited by examiner

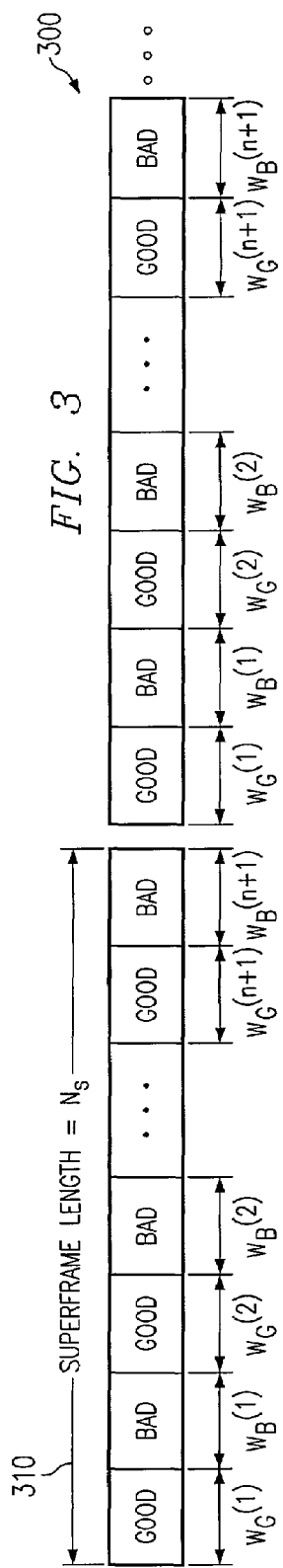
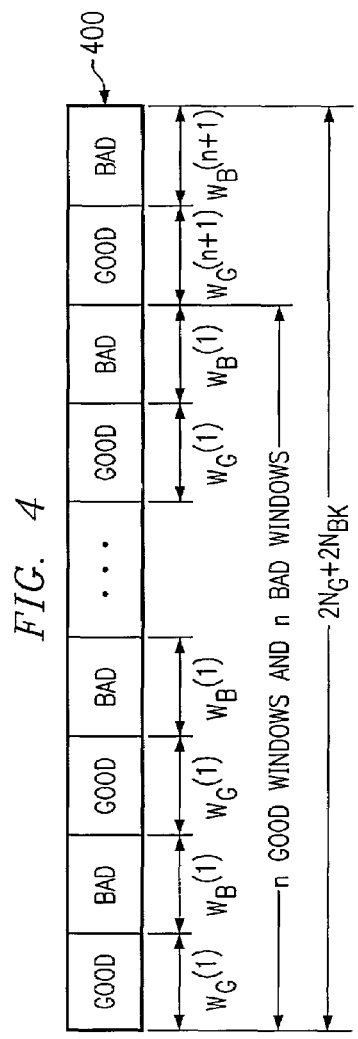
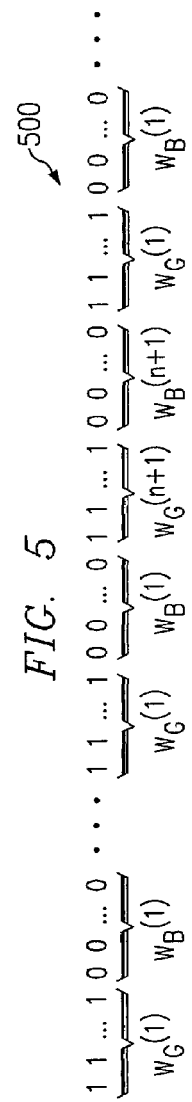

| $N_V$ = NUMBER OF HV1 STREAMS | $D_{sco}$ | $G_j$ = NUMBER OF GOOD CHANNELS ASSIGNED TO $F_j$ | PARTITION SEQUENCE, p(k) |
|---|---|---|---|
| 1 | 0 | 0 | [0 0] |
| 1 | 0 | 2 | [1 1] |

FIG. 8

| $N_V$ = NUMBER OF HV2 STREAMS | $D_{sco}$ | $G_j$ = NUMBER OF GOOD CHANNELS ASSIGNED TO $F_j$ | PARTITION SEQUENCE, p(k) |
|---|---|---|---|
| x | x | 0 | [0 0 0 0] |
| 1 | 0 | 2 | [1 1 0 0] |
| 1 | 2 | 2 | [0 0 1 1] |
| 2 | 0,2 | 2 | [1 1 0 0] |
| x | x | 4 | [1 1 1 1] |

FIG. 9

| $N_V$ = NUMBER OF HV3 STREAMS | $D_{sco}$ | $G_j$ = NUMBER OF GOOD CHANNELS ASSIGNED TO $F_j$ | PARTITION SEQUENCE, p(k) |
|---|---|---|---|
| x | x | 0 | [0 0 0 0 0 0] |
| 1 | 0 | 2 | [1 1 0 0 0 0] |
| 1 | 2 | 2 | [0 0 1 1 0 0] |
| 1 | 4 | 2 | [0 0 0 0 1 1] |
| 1 | 0 | 4 | [1 1 1 1 0 0] |
| 1 | 2 | 4 | [1 1 1 1 0 0] |
| 1 | 4 | 4 | [1 1 0 0 1 1] |
| 2 | 0,2 | 2 | [1 1 0 0 0 0] |
| 2 | 0,4 | 2 | [1 1 0 0 0 0] |
| 2 | 2,4 | 2 | [0 0 1 1 0 0] |
| 2 | 0,2 | 4 | [1 1 1 1 0 0] |
| 2 | 0,4 | 4 | [1 1 0 0 1 1] |
| 2 | 2,4 | 4 | [0 0 1 1 1 1] |
| 3 | 0,2,4 | 2 | [1 1 0 0 0 0] |
| 3 | 0,2,4 | 4 | [1 1 1 1 0 0] |
| x | x | 6 | [1 1 1 1 1 1] |

FIG. 10

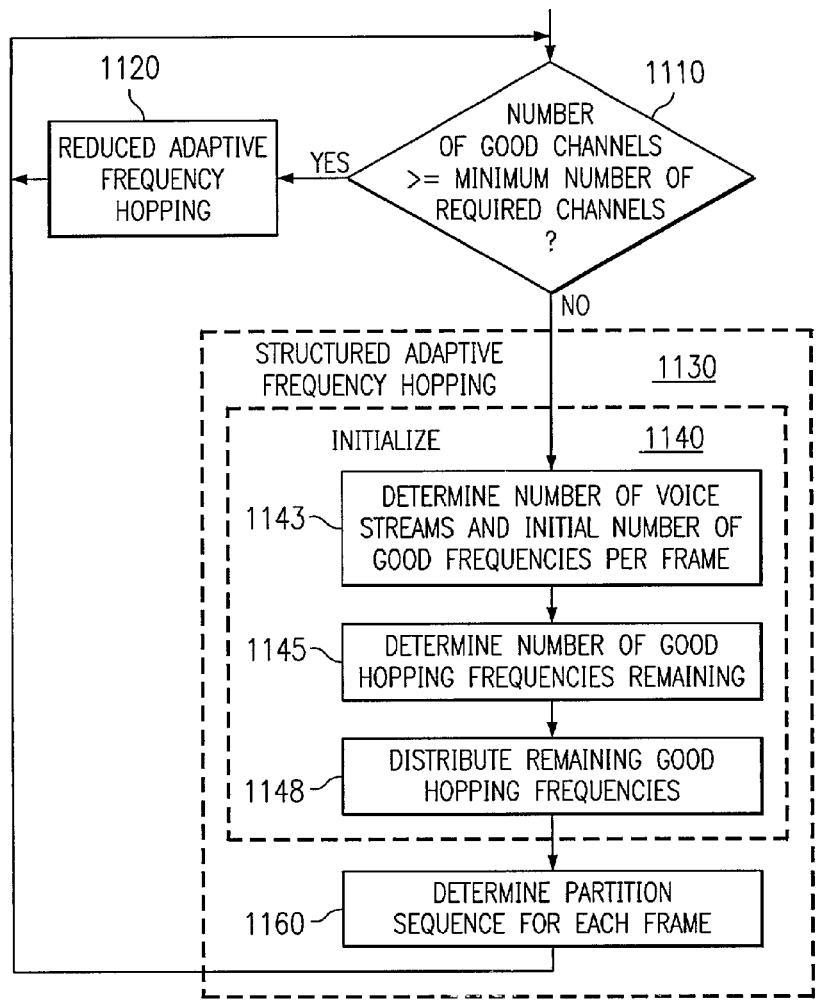
FIG. 11
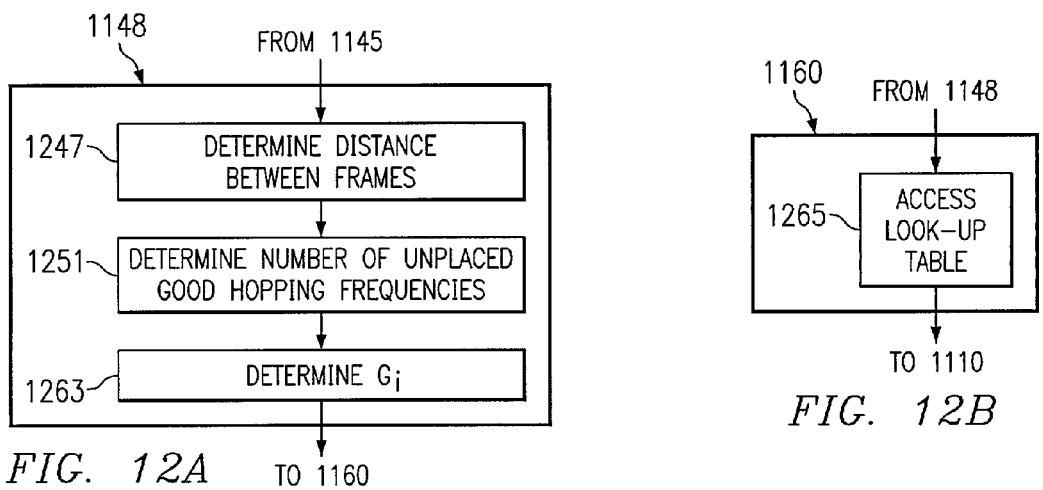
FIG. 12A
FIG. 12B

*FIG. 15*

| INDEX | $S_G$ | $S_{BK}$ | $S_{BN}$ |
|---|---|---|---|
| 0 | 0 | 40 | 60 |
| 1 | 2 | 42 | 62 |
| 2 | 4 | 44 | 64 |
| 3 | 6 | 46 | 66 |
| 4 | 8 | 48 | 68 |
| 5 | 10 | 50 | 70 |
| 6 | 12 | 52 | 72 |
| 7 | 14 | 54 | 74 |
| 8 | 16 | 56 | 76 |
| 9 | 18 | 58 | 78 |
| 10 | 20 | 41 | 61 |
| 11 | 22 | 43 | 63 |
| 12 | 24 | 45 | 65 |
| 13 | 26 | 47 | 67 |
| 14 | 28 | 49 | 69 |
| 15 | 30 | 51 | 71 |
| 16 | 32 | 53 | 73 |
| 17 | 34 | 55 | 75 |
| 18 | 36 | 57 | 77 |
| 19 | 38 | 59 | |
| 20 | 1 | | |
| 21 | 3 | | |
| 22 | 5 | | |
| 23 | 7 | | |
| 24 | 9 | | |
| 25 | 11 | | |
| 26 | 13 | | |
| 27 | 15 | | |
| 28 | 17 | | |
| 29 | 19 | | |
| 30 | 21 | | |
| 31 | 23 | | |
| 32 | 25 | | |
| 33 | 27 | | |
| 34 | 29 | | |
| 35 | 31 | | |
| 36 | 33 | | |
| 37 | 35 | | |
| 38 | 37 | | |
| 39 | 39 | | |

| p(k) | S? | $f_k$ | RE-MAP? | $R_k$ | k' | $f_{adp}$ |
|---|---|---|---|---|---|---|
| 1 | $S_G$ | 1 | NO | -- | -- | 1 |
| 1 | $S_G$ | 49 | YES | 16 | 25 | 11 |
| 1 | $S_G$ | 64 | YES | 38 | 22 | 5 |
| 1 | $S_G$ | 17 | NO | -- | -- | 17 |
| 0 | $S_{BK}$ | 32 | YES | 16 | 8 | 56 |
| 0 | $S_{BK}$ | 77 | YES | 19 | 16 | 53 |
| 1 | $S_G$ | 38 | NO | -- | -- | 38 |
| 1 | $S_G$ | 10 | NO | -- | -- | 10 |
| 1 | $S_G$ | 46 | YES | 2 | 8 | 16 |
| 1 | $S_G$ | 70 | YES | 49 | 39 | 39 |
| 0 | $S_{BK}$ | 23 | YES | 23 | 6 | 52 |
| 0 | $S_{BK}$ | 42 | NO | -- | -- | 42 |
| 1 | $S_G$ | 18 | NO | -- | -- | 18 |
| 1 | $S_G$ | 12 | NO | -- | -- | 12 |
| 1 | $S_G$ | 35 | NO | -- | -- | 35 |
| 1 | $S_G$ | 58 | YES | 58 | 36 | 33 |
| 0 | $S_{BK}$ | 47 | NO | -- | -- | 47 |
| 0 | $S_{BK}$ | 21 | YES | 7 | 8 | 56 |

| p(k) | S? | $f_k$ | RE-MAP? | $R_k$ | k' | $f_{adp}$ |
|---|---|---|---|---|---|---|
| 1 | $S_G$ | 1 | NO | -- | -- | 1 |
| 1 | $S_G$ | 49 | YES | 16 | 25 | 11 |
| 1 | $S_G$ | 64 | YES | 38 | 22 | 5 |
| 1 | $S_G$ | 17 | NO | -- | -- | 17 |
| 1 | $S_G$ | 32 | NO | -- | -- | 32 |
| 1 | $S_G$ | 77 | YES | 19 | 16 | 32 |
| 1 | $S_G$ | 38 | NO | -- | -- | 38 |
| 1 | $S_G$ | 10 | NO | -- | -- | 10 |
| 1 | $S_G$ | 46 | YES | 2 | 8 | 16 |
| 1 | $S_G$ | 70 | YES | 49 | 39 | 39 |
| 1 | $S_G$ | 23 | NO | -- | -- | 23 |
| 1 | $S_G$ | 42 | YES | 35 | 37 | 35 |
*FIG. 17*
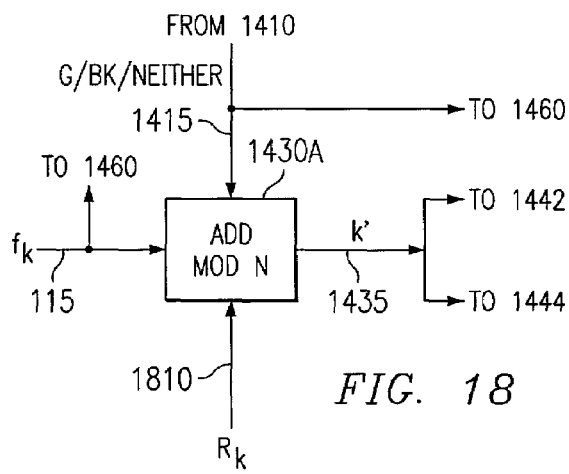
*FIG. 18*
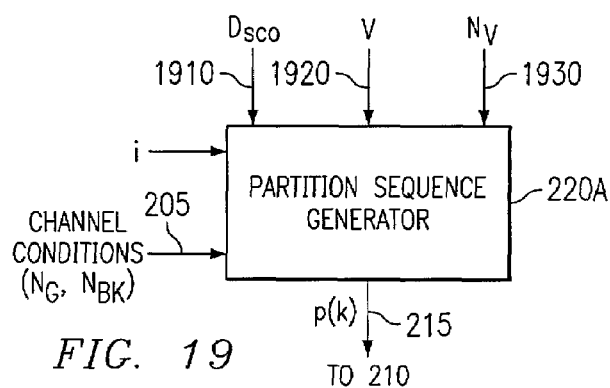
*FIG. 19*

STRUCTURED ADAPTIVE FREQUENCY HOPPING

This application claims the priority under 35 U.S.C. § 119(e)(1) of copending U.S. provisional patent application 60/318,841, filed Sep. 11, 2001. This application is a Continuation-in-Part and claims priority under 35 U.S.C. § 120 of U.S. patent application U.S. Ser. No. 10/003,864 filed on Nov. 2, 2001 now U.S. Pat. No. 7,236,511, which claims priority U.S. provisional patent application 60/262,006, filed Jan. 16, 2001. This application is also related to the following copending U.S. patent applications: U.S. Ser. No. 10/003,865 filed on Nov. 2, 2001, now U.S. Pat. No. 7,116,699 issued on Oct. 3, 2006; U.S. Ser. No. 10/004,304 filed on Nov. 2,2001; and U.S. Ser. No. 60/355,010 filed on Feb. 6, 2002. The aforementioned patent applications are incorporated herein by reference.

FIELD OF THE INVENTION

The invention relates generally to wireless communications and, more particularly, to a method and apparatus for adaptive frequency hopping.

BACKGROUND OF THE INVENTION

Some wireless networks, such as Bluetooth, are wireless replacements for low data-rate wired connections, such as parallel and serial cables. Bluetooth networks operate in the 2.4 GHz Industrial, Scientific, and Medical ("ISM") band as described in Bluetooth Specification Version 1.1 dated Feb. 22, 2001, herein incorporated by reference. The 2.4 GHz ISM band is an unlicensed band (meaning that anyone may use the spectrum of this band as long as they comply with the specified spectrum usage regulations.). This band has been set aside by the Federal Communications Commission ("FCC") of the United States. Several other countries, including the majority of Europe, have also set aside this radio frequency ("RF") spectrum as an unlicensed band. Some of the other technologies that occupy this unlicensed band include IEEE 802.11b wireless networks, cordless phones and microwave ovens.

Many wireless protocols, such as Bluetooth, are generally interference limited systems meaning that interference can limit throughput and packet transfer rates. The SINR (signal to interference and noise ratio) requirement of wireless systems is such that the signal needs to be strong enough so that it can be discerned over system interference and noise, which enables data i.e. a packet to be demodulated. Some exemplary sources of interference in 2.4 GHz band include 802.11b networks, cordless phones, and microwave ovens. Interference is the dominant source of degradation in Bluetooth systems. For example, interference from an 802.11b network degrades packet transmission, and degrades the ability to decode a packet. Even if there is no interference, Bluetooth may be limited by other factors, such as multipath problems. Multipath problems refers to signal reflections from walls, trees, buildings, and other physical objects that cause difficulty in signal reception and translation.

Presently, a Bluetooth network can include a single master and up to seven slaves. The master and the slave(s) are required to transmit on an even and an odd time slot, respectively. Time slots dedicated to the master are referred to as master-to-slave time slots, while the time slots dedicated to the slave are referred to as slave-to-master time slots. Each time slot spans 625 microseconds. Depending on the packet type selected by either the master or the slave, a Bluetooth packet can occupy 1, 3, or 5 time slots. The maximum data rate that a Bluetooth device can support is 1 Mbps. Over time, a Bluetooth signal actually occupies 79 MHz of the available 83.5 MHz in the ISM band.

Bluetooth networks use a frequency hopping mechanism, meaning that a Bluetooth transmission changes the transmission frequency after each packet. A frequency is assigned to each slot. These frequencies depend on the master address and clock. When a Bluetooth device transmits a packet that occupies more than one (1) time slot, it holds the same frequency for the entire packet length. After the transmission is complete, the Bluetooth device resumes with the frequency for the next slot. Accordingly, when another device is operating at a frequency that is also used by the Bluetooth network, mutual interference between Bluetooth and the other device operating in the 2.4 GHz ISM band can and does occur. From the perspective of a Bluetooth device, these other devices appear as static interferers. The net effect of this interference is an increase in the packet error rate and a corresponding decrease in the effective data transfer rate (throughput). In fact, in the presence of interference, the data transfer rate (throughput) may drop to only a fraction of the maximum.

Frequency-Hopping Spread Spectrum ("FHSS") is a system that changes frequency (also called "hopping") at a rate of 1600 Hz over seventy-nine (79) 1-MHz-wide channels (typically numbered channel zero, channel one, etc.). Adaptive frequency hopping ("AFH") is a method for adaptively modifying the hopping sequence to intelligently hop around interference in order to minimize signal collisions and increase data throughput and reliability. Frequency hopping Bluetooth systems normally assign 1 MHz of bandwidth to each of the seventy-nine (79) frequency channels, switching 1,600 times per second. With AFH, a Bluetooth system first measures the ratio of packet loss in the pre-communication, and selects about fifteen (15) frequency channels with the lowest interference. This approach makes it possible to send and receive Bluetooth data without affecting the 22 MHz bandwidth used by IEEE 802.11b and vice versa. As there is no throughput loss for either, and IEEE 802.11b does not have to be modified, AFH is highly practical.

The current approach for adaptive frequency hopping within the Bluetooth Coexistence Working Group is to hop over a reduced set of hopping frequencies that are deemed to be free of interference; in other words, to hop over only the good channels. A simplified block diagram for this adaptive frequency hopping mechanism 100 is shown in FIG. 1. Master clock 103 and master address 105 are fed into Legacy Hop Kernel 110 which generates hopping frequency $f_k$ 115 ($f_k$ can be defined as the next hop-frequency such that $f_k \in [0, , 78]$). Hopping frequency $f_k$ 115 is then used as an input to Frequency Re-Mapper 120 which produces next adapted hop-frequency $f_{adp}$ 125 ($f_{adp} \in S_G$, where $S_G$ represents a set of good channels). In this scheme, the good channels essentially pass through Frequency Re-Mapper 120 unchanged, while the bad channels are uniformly re-mapped onto the set of good channels. If there are enough ($N_G$) good channels in the band to satisfy the regulatory constraints ($N_{min}$), i.e., $N_G \geq N_{min}$, then the proposed mechanism works quite well. However, if there are not enough good channels in the band (e.g., when several 802.11b access points are located in close proximity), then bad channels (from $S_{BK}$, where $S_{BK}$ represents a set of bad channels to be kept in the adapted hopping sequence) have to be inserted into the adaptive hopping sequence in order to reach the minimum number ($N_{min}$) of hop-frequencies. These bad channels can have a serious impact on the throughput and packet loss rate. As more technologies enter the 2.4 GHz ISM band, the number of available clear good channels will decrease.

For a synchronous connection-oriented ("SCO") link, a single bad channel can result in the loss of an entire voice packet. Since there is no automatic retransmission request ("ARQ") protocol for SCO, this voice data can never be recovered. For an asynchronous connection-less link ("ACL"), the transitions between good and bad channels result in wasted resources and/or retransmissions. Since bad channels occur randomly in current hopping sequence methods, the loss of voice packets for an SCO connection or wasted resources and/or retransmissions for an ACL connection cannot be avoided.

It is therefore desirable to provide an adaptive frequency hopping solution that has low computational complexity while still mitigating the interference effects of bad channels. The present invention can provide this by using a structured adapted hopping sequences that reduces the occurrences of transitions between good and bad channels and/or assign good channels to slots where data is to be transmitted and bad channels to idle slots. The adaptive frequency hopping mechanism of the present invention is flexible enough to hop over only the good channels when the number of good channels available meets or exceeds a minimum required number of good channels, and can also generate a structured adaptive hopping sequence to reduce the effects of interference when bad channels must be used. The present invention can be designed to comply with current FCC regulations, yet remain adaptable to changing rules.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which:

FIG. 3 illustrates an example of a structured adapted hopping sequence in accordance with an exemplary embodiment of the present invention;

FIG. 4 illustrates a structured adaptive hopping sequence for an asynchronous connection-less link ("ACL") in accordance with an exemplary embodiment of the present invention;

FIG. 5 illustrates an exemplary partition sequence for an ACL connection in accordance with an exemplary embodiment of the present invention;

FIG. 8 illustrates exemplary partition sequence values for an HV1 SCO connection in accordance with an exemplary embodiment of the present invention;

FIG. 9 illustrates exemplary partition sequence values for an HV2 SCO connection in accordance with an exemplary embodiment of the present invention;

FIG. 10 illustrates exemplary partition sequence values for an HV3 SCO connection in accordance with an exemplary embodiment of the present invention;

FIG. 11 illustrates an exemplary flow chart for generating a partition sequence for an SCO connection in accordance with an exemplary embodiment of the present invention;

FIGS. 12A and 12B illustrate details for the exemplary flow chart of FIG. 11 in accordance with an exemplary embodiment of the present invention;

FIG. 15 illustrates a table of exemplary channel sets in accordance with an exemplary embodiment of the present invention;

FIG. 16 illustrates an exemplary re-mapped hopping sequence for $N_{min}=60$ using the channel sets of FIG. 15 in accordance with an exemplary embodiment of the present invention;

FIG. 17 illustrates an exemplary re-mapped hopping sequence for $N_{min}=36$ using the channel sets of FIG. 15 in accordance with an exemplary embodiment of the present invention;

FIG. 18 illustrates pertinent portions of a block diagram of re-mapping a hop-frequency in accordance with an exemplary embodiment of the present invention;

FIG. 19 illustrates an exemplary embodiment of a partition sequence generator in accordance with the present invention.

DETAILED DESCRIPTION

While the making and using of various embodiments of the present invention are discussed herein in terms of specific variables, channel parameters and wireless networks, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention provides a low computational complexity adaptive frequency hopping mechanism that mitigates the interference effects of bad channels. The present invention can provide a structured adapted hopping sequences that reduces the transitions between good and bad channels and/or assign good channels to slots where data is to be transmitted and bad channels to idle slots. An adaptive frequency hopping mechanism according to the invention generates a partition sequence that is periodic, and can therefore be provided by calculating the partition sequence over only one superframe and storing the results in memory. Thus, the adaptive frequency hopping mechanism can perform a table look-up to generate a partition sequence for use in the adaptive hopping sequence. The adaptive frequency hopping mechanism of the present invention is flexible enough to hop over only the good channels when the number of good channels available meets or exceeds a minimum required number of good channels, and can also generate a structured adaptive hopping sequence to reduce the effects of interference when bad channels must be used. The present invention can be designed to comply with current Federal Communication Commission ("FCC")

regulations in the United States, while maintaining the flexibility to adapt to rules that exist in other countries and new rules that may be adopted in the United States.

Figure 2:
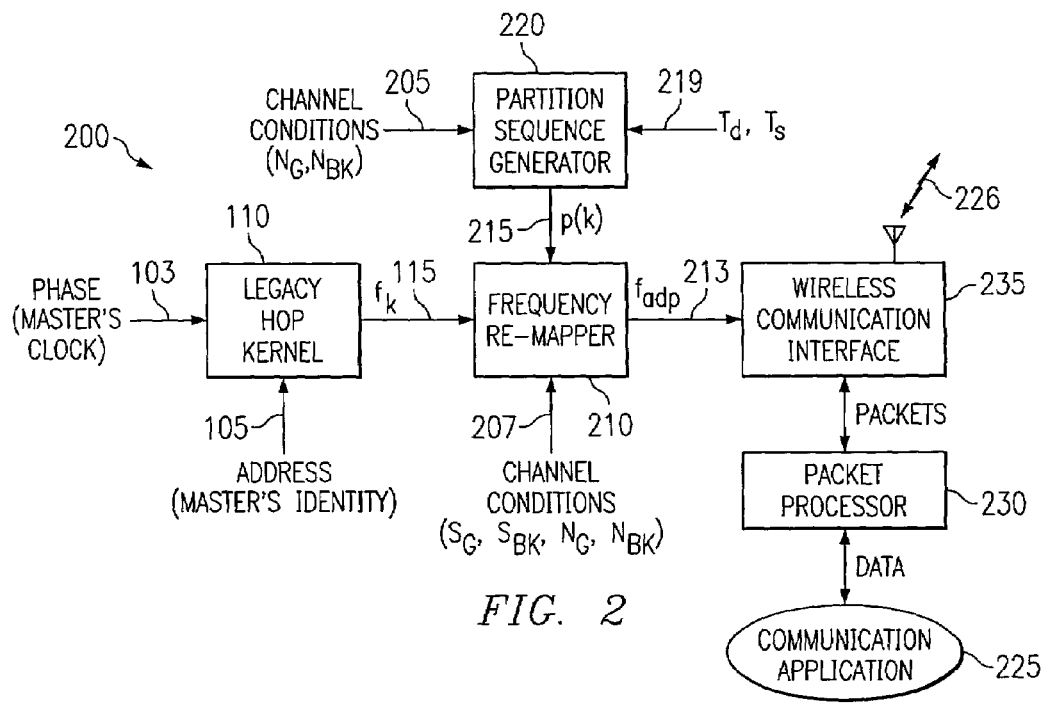
FIG. 2 illustrates a block diagram of a structured adaptive frequency hopping mechanism in accordance with an exemplary embodiment of the present invention.

FIG. 2 illustrates exemplary embodiments of a wireless communication (e.g., Bluetooth) apparatus including a structured adaptive frequency hopping mechanism. Examples of the apparatus of FIG. 2 include mobile devices such as mobile telephones, laptop computers, personal digital assistants ("PDA"), etc. Three (3) exemplary main components of adaptive frequency hopping mechanism 200 can be: Legacy Hop Kernel 110, Frequency Re-Mapper 210 and Partition Sequence Generator 220. In conventional fashion, master clock 103 and master address 105 can be fed into Legacy Hop Kernel 110 which can generate hopping frequency $f_k$ 115 ($f_k$ can be defined as the next hop-frequency, such that, for Bluetooth embodiments, $f_k \in [0, \ldots, 78]$).

Partition Sequence Generator 220 can impose structure on the hopping sequence. Conventionally available channel conditions 205 (such as $N_G$ and $N_{BK}$, where $N_G$ represents the number of good channels in the set of good channels, $S_G$, such that $N_G=|S_G|$, and $N_{BK}$ represents the number of bad channels in the set of bad channels that are to be kept in the adapted hopping sequence, $S_{BK}$, such that $N_{BK}=|S_{BK}|$) can be fed into Partition Sequence Generator 220. Adaptive frequency hopping mechanism 200 can be provided with a conventionally available list of both good channels ($S_G$) and bad channels ($S_B$) in the spectrum. The set of bad channels ($S_B$) can then be further divided into the set of bad channels that are to be kept in the hopping sequence ($S_{BK}$) and into the set of bad channels that are to be removed from the hopping sequence ($S_{BR}$). The actual size of these partitions depends on the minimum number of hopping channels needed ($N_{min}$). The size of each partition can be given by the following two (2) equations:

$$N_{BK} = \max(0, N_{min} - N_G), \quad \text{(Equation 1)}$$

$$N_{BR} = N_B - N_{BK}, \quad \text{(Equation 2)}$$

where $N_{BR}$ represents the number of bad channels in the set $S_{BR}$ such that $N_{BR}=|S_{BR}|$ and $N_B$ represents the number of bad channels in the set $S_B$ such that $N_B=|S_B|$. The function, max (x,y), returns the greater of x and y. To improve the performance of the AFH mechanism, $S_{BK}$ can be comprised of the best $N_{BK}$ elements of $S_B$, while $S_{BR}$ can be comprised of the remaining elements of $S_B$.

In addition to channel conditions 205 and timing values 219 (e.g., timeout value, $T_d$, and time slot length, $T_s$) can be input to Partition Sequence Generator 220. Partition Sequence Generator 220 can use these inputs, as described in greater detail below, to generate partition sequence p(k) 215. When partition sequence p(k) 215 is viewed from the perspective of sets (e.g., $S_G$ or $S_{BK}$), there is a pattern and grouping (i.e., structure) of hopping frequencies from the same set. However, when partition sequence p(k) 215 is viewed from the perspective of the hopping frequencies, it still appears to be random.

Hopping frequency $f_k$ 115, channel conditions 207 (such as $S_G$, $S_{BK}$, $N_G$ and $N_{BK}$, where $S_G$ represents a set of good channels or indices pointing to good channels, $S_{BK}$ represents a set of bad channels, or indices pointing to bad channels, that are kept in the adapted hopping sequence, $N_G$ represents the number of good channels in the set of good channels, $S_G$, such that $N_G=|S_G|$, and $N_{BK}$ represents the number of bad channels in the set of bad channels that are to be kept in the adapted hopping sequence, $S_{BK}$, such that $N_{BK}=|S_{BK}|$), and partition sequence p(k) 215 can be used as inputs to Frequency Re-Mapper 210 to calculate next adapted hop-frequency $f_{adp}$ 213 (such that $f_{adp} \in S_G$ or $f_{adp} \in S_{BK}$). In general, Frequency Re-Mapper 210 uniformly re-maps, as necessary, hopping frequency $f_k$ 115 produced by Legacy Hop Kernel 110 onto the set (e.g., $S_G$ or $S_{BK}$) defined by partition sequence p(k) 215. Partition sequence p(k) 215 can compactly represent the structure of the hopping sequence by specifying the set (e.g., $S_G$ or $S_{BK}$) such that at the $k^{th}$ slot, partition sequence p(k) 215 can take on one (1) of the following two (2) values:

$$p(k) = \begin{cases} 1 & \text{if } f_{adp} \text{ should be an element of } S_G \\ 0 & \text{if } f_{adp} \text{ should be an element of } S_{BK} \end{cases}. \quad \text{(Equation 3)}$$

Figure 1:
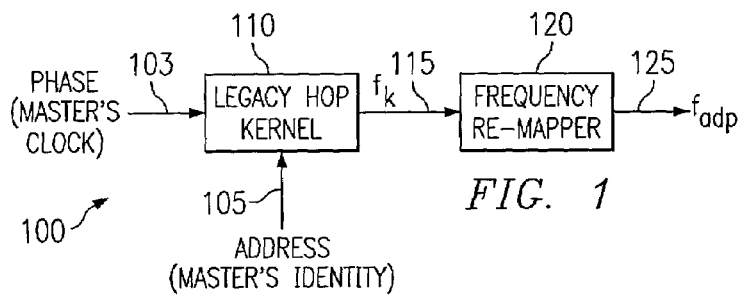
FIG. 1 illustrates a block diagram of a reduced set adaptive frequency hopping mechanism as known in the art.

Therefore, when the partition sequence p(k) 215 input to Frequency Re-Mapper 210 is a constant signal of one (1), i.e., $p(k)=1 \forall k$, adaptive frequency hopping mechanism 200 can produce a reduced adapted hopping sequence that only hops over good channels, similar to the reduced adapted hopping sequence of adaptive frequency hopping mechanism 100 shown in FIG. 1. Otherwise, $f_{adp}$ 213 can represent a structured adapted hopping sequence. A packet processor 230 and a wireless communication interface 235 can use conventional techniques to interface a conventional communication application 225 to a wireless communication link 226 using the frequencies specified by $f_{adp}$ 213.

FIG. 3 illustrates an example of a structured adapted hopping sequence 300 in accordance with an exemplary embodiment of the present invention. Structured adapted hopping sequence 300 can have good window $W_G^{(1)}$ including successive hop-frequencies from the set of good channels ($S_G$), followed by bad window $W_B^{(1)}$ including successive hop-frequencies from the set of bad channels to be kept ($S_{BK}$), followed by good window $W_G^{(2)}$ including successive hop-frequencies from the set of good channels ($S_G$), and so on through good window $W_G^{(n+1)}$ and bad window $W_B^{(n+1)}$, thereby defining superframe 310 of length, $N_s$, where $N_s$ can be equal to an even multiple of the number of channels (hopping frequencies) kept in structured adapted hopping sequence 300. For Bluetooth embodiments, the even multiplier can be, for example, 2, 4 or 6, depending on whether the connection is an asynchronous connection-less link ("ACL") connection (usually 2) or a synchronous connection-oriented ("SCO") link (usually 2, 4 or 6). The number of channels that are kept in adapted hopping sequence 300 can be equal to the number of good channels kept ($N_G$) plus the number of bad channels kept ($N_{BK}$). Each good window, $W_G^{(i)}$, can be comprised of an even number of good channels selected from the set of good channels kept ($S_G$) in structured adapted hopping sequence 300. Each bad window, $W_B^{(i)}$, can be comprised of an even number of bad channels ($N_B$), which can be selected from the set of bad channels kept ($S_{BK}$) in structured adapted hopping sequence 300. The structure of superframe 310 is repeated indefinitely to form structured adapted hopping sequence 300. Structured adapted hopping sequence 300 does not specify the exact frequency at each slot, but does limit the hopping frequency to a particular set (e.g., $S_G$ or $S_{BK}$), as described above.

In general, the optimal lengths of windows $W_G^{(i)}$ and $W_B^{(i)}$ for structured adapted hopping sequence 300 will depend upon the number ($N_G$) of good channels and the number ($N_B$) of bad channels available in the band. First, consider the case when $N_G \geq N_{min}$. The optimal window lengths, for this case, are given by:

$$n=0, W_B^{(1)}=0, \text{ and } W_G^{(1)}=2N_G \Rightarrow p(k)=1 \forall k. \quad \text{(Equation 4)}$$

This result holds true for both ACL and SCO connections. This implies that the optimal structure for the hopping sequence should be comprised of only good hop-frequencies, i.e., p(k)=1∀k. In other words, when $N_G \geq N_{min}$, reduced adaptive frequency hopping (hopping only over the good channels) should be used. However, when $N_G < N_{min}$, determination of the optimal window lengths differs between ACL and SCO connections.

For an ACL connection, the implementation complexity can be reduced in some embodiments by forcing the first n good windows ($W_G^{(1)} = W_G^{(i)}$ for $i \in \{2, \ldots, n\}$) to be of equal length and by forcing the first n bad windows ($W_B^{(i)} = W_B^{(1)}$ for $i \in \{2, \ldots, n\}$) to be of equal length. In some embodiments, the total number of good and bad hopping frequencies within a period of the partition sequence is equal to $2N_G + 2N_{BK}$. Thus, the period of the partition sequence is also equal to $2N_G + 2N_{BK}$. This is illustrated in structured adaptive hopping sequence 400 of FIG. 4. The optimal structure of adaptive hopping sequence 400 for an ACL connection when $N_G < N_{min}$ can be determined as described below.

Figure 2A:
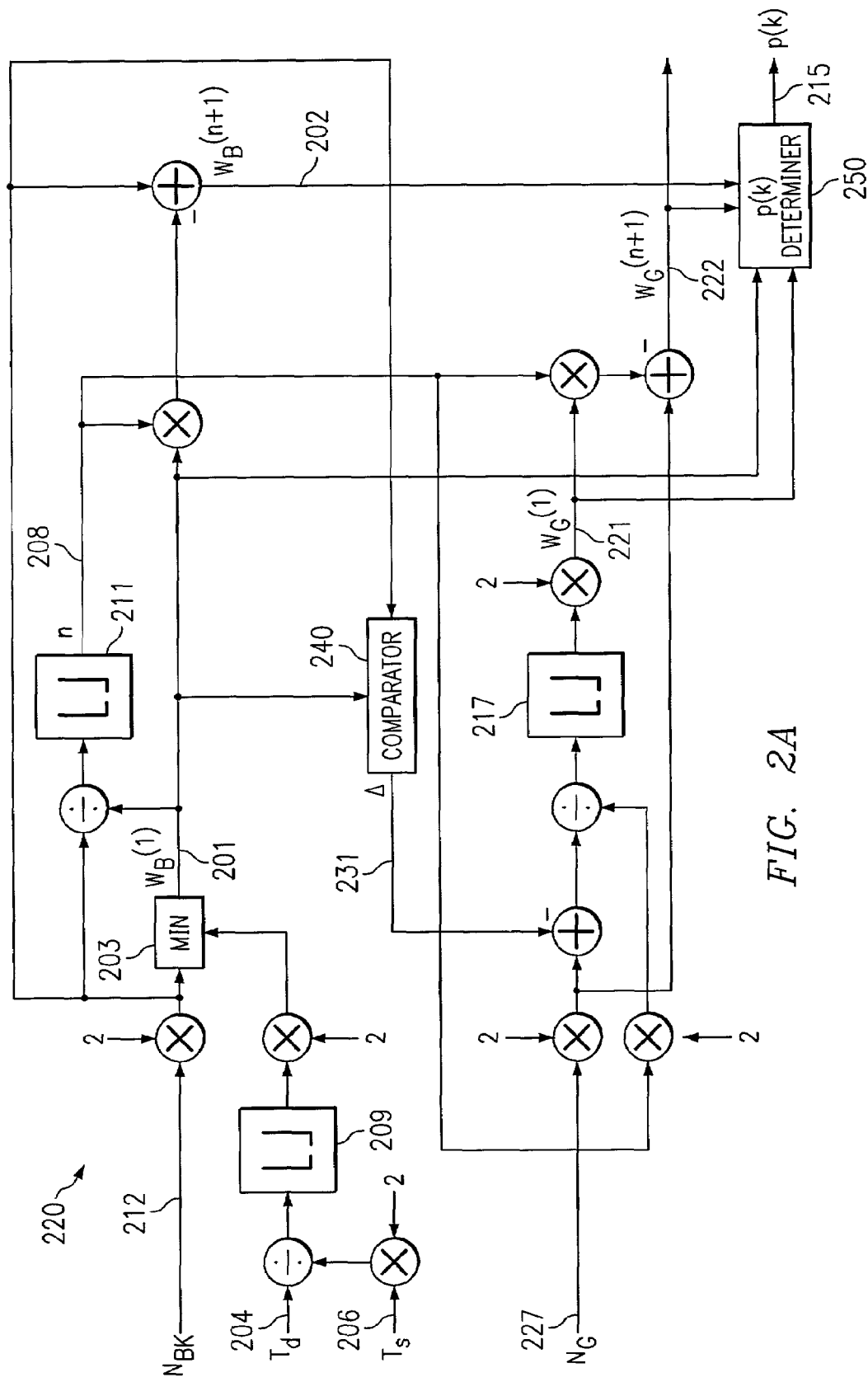
FIG. 2A illustrates exemplary embodiments of the partition sequence generator of FIG. 2.

FIG. 2A illustrates exemplary embodiments of the partition sequence generator of FIG. 2, including various devices for implementing Equations 5-10 below. The length of first bad window $W_B^{(1)}$ 201 can be constrained by a timeout value for the link. To avoid timeouts in some embodiments, the size of $W_B^{(1)}$ 201 satisfies the following relationship:

$$W_B^{(1)} = \min\left\{2N_{BK}, 2\left\lfloor \frac{T_d}{2T_s} \right\rfloor\right\}. \quad \text{(Equation 5)}$$

where $N_{BK}$ 212 is the number of bad channels kept, $T_d$ 204 is the timeout value and $T_s$ 206 is the time slot length for the wireless network, such as Bluetooth. The device at 203, min (x,y), returns the lesser of x and y. Floor devices ⌊ ⌋ 209, 211 and 217 return the next lower integer of their arguments. For example, ⌊3.89⌋ would return a 3. The size of last bad window $W_B^{(n+1)}$ 202 can be given by:

$$W_B^{(n+1)} = 2N_{BK} - nW_B^{(1)}, \quad \text{(Equation 6)}$$

where n 208 can be defined by the following equation:

$$n = \left\lfloor \frac{2N_{BK}}{W_B^{(1)}} \right\rfloor. \quad \text{(Equation 7)}$$

The length of last bad window $W_B^{(n+1)}$ 202 will be smaller than the length of first bad window $W_B^{(1)}$ 201. Therefore, a timeout should not occur at the higher layers.

Given the value of n 208, the optimal value for the length of first good window $W_G^{(1)}$ 221 can be determined as:

$$W_G^{(1)} = 2\left\lfloor \frac{2N_G - \Delta}{2n} \right\rfloor, \quad \text{(Equation 8)}$$

where $$\Delta = \begin{cases} 0 & \text{if } W_B^{(1)} = 2N_{BK} \\ 2 & \text{otherwise} \end{cases} \quad \text{(Equation 9)}$$

and $N_G$ 227 is the number of good channels. Comparator 240 can generate $\Delta$ 231.

The optimal value for last good window $W_G^{(n+1)}$ 223 can be given by:

$$W_G^{(n+1)} = 2N_G - nW_G^{(1)}. \quad \text{(Equation 10)}$$

Determiner 250 can use $W_B^{(1)}$ 201, $W_B^{(n+1)}$ 202, $W_G^{(1)}$ 221 and $W_G^{(n+1)}$ 222 to determine p(k) 215. An example of such p(k) is shown in FIG. 5.

Figure 6:
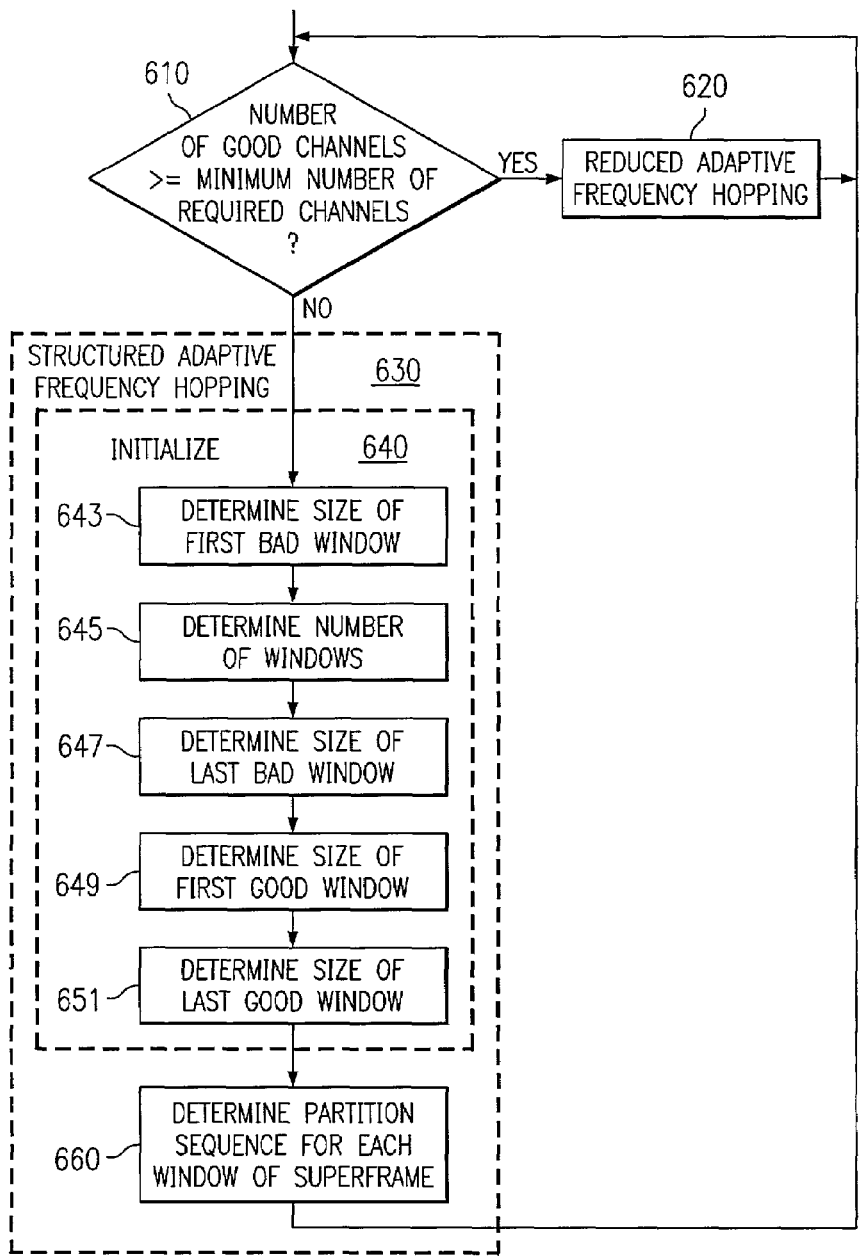
FIG. 6 illustrates an exemplary flow chart for generating a partition sequence for an ACL connection in accordance with an exemplary embodiment of the present invention.

A partition sequence generator, such as partition sequence generator 220 (FIG. 2), can generate a partition sequence for an ACL connection, such as partition sequence 500 (FIG. 5) by following the exemplary steps summarized in the flow chart of FIG. 6. A check can be made in decision point 610 to determine if $N_G \geq N_{min}$. If $N_G \geq N_{min}$ is true in decision point 610, then conventional reduced adaptive frequency hopping (i.e., assigning a "1" to all windows or p(k)=1 for all windows) can be used in block 620. As long as $N_G \geq N_{min}$ remains true, the conventional reduced adaptive frequency hopping of block 620 can continue. If, however, $N_G \geq N_{min}$ is false in decision point 610, then structured adaptive frequency hopping in block 630 can be used. The structured adaptive frequency hopping in block 630 includes into two (2) main steps: first, initialize in block 640 and then determine in block 660 the partition sequence, such as partition sequence 500 (FIG. 5), for each window of the superframe. An exemplary block 640 initialize procedure determines the size of first bad window $W_B^{(1)}$ (Equation 5) in block 643, determines the number of bad (and good) windows n (Equation 7) in block 645, determines the size of last bad window $W_B^{(n+1)}$ (Equation 6) in 647, determines the size of first good window $W_G^{(1)}$ (Equations 8 and 9) in 649, and determines the size of last good window $W_G^{(n+1)}$ (Equation 10) in 651. The results of the block 640 initialize can then be used in block 660 to determine the partition sequence, such as partition sequence 500 (FIG. 5), for each window of the superframe. An exemplary procedure for implementing block 660 could include setting variables based on the results of block 640 to indicate how many windows of each type exist, and looping through all the windows, assigning a "1" to "good" windows and a "0" to "bad" windows (i.e., p(k)=1 or p(k)=0). In some embodiments, the master can determine the values for Equations 5, 6, 8 and 10 and then transmit the values to all the slave devices. Each slave device can then use the received values to implement identical partition sequences. The partition sequence generator in each slave device would then require only the determiner 250 of FIG. 2A. Each device can use the partition sequence it generated to determine how the frequency generated by the legacy hop kernel can be re-mapped. Since each device would have the same parameters and the same partition sequence generator, they can operate synchronously and can re-map to identical frequencies at the same time.

Figure 7:
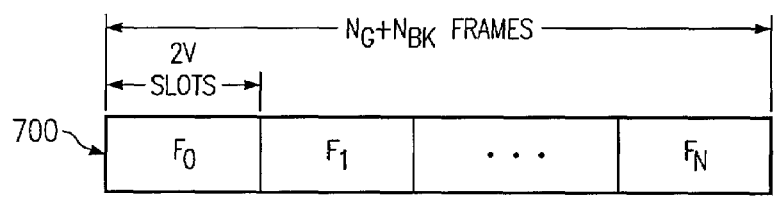
FIG. 7 illustrates a structured adaptive hopping sequence for a synchronous connection-oriented ("SCO") link in accordance with an exemplary embodiment of the present invention.

A conventional water-filling approach can be used by partition sequence generator 220A (FIG. 19) to design the structure of the partition sequence when, for example, there is at least one (1) voice connection active in a Bluetooth piconet (i.e., a conventional SCO+ACL connection). First, the good channels can be distributed on slots where voice packets are to be transmitted. Since the SCO packets are not protected by an automatic retransmission request ("ARQ") mechanism, they can be given higher protection. If there are any remaining good channels, then these channels can be uniformly distributed to the ACL traffic. Finally, the bad channels can be assigned to the remaining slots. FIG. 7 illustrates structured adaptive hopping sequence 700 for an SCO link in accordance with an exemplary embodiment of the present invention. In FIG. 7, V represents the voice link type (V=1 for HV1, V=2 for HV2, V=3 for HV3) for the SCO connection. Since the voice connection is periodic, it is more convenient to view structured adaptive hopping sequence 700 in terms of N frames each of length 2V, where $F_1$ denotes the i-th frame for i =0, ..., N, and N=$N_G$+$N_{BK}$. Structured adaptive hopping sequence 700 can be aligned with the inherent structure of the SCO packets. The period of the partition sequence or superframe is 2V($N_G$+$N_{BK}$) time slots.

Figure 19A:
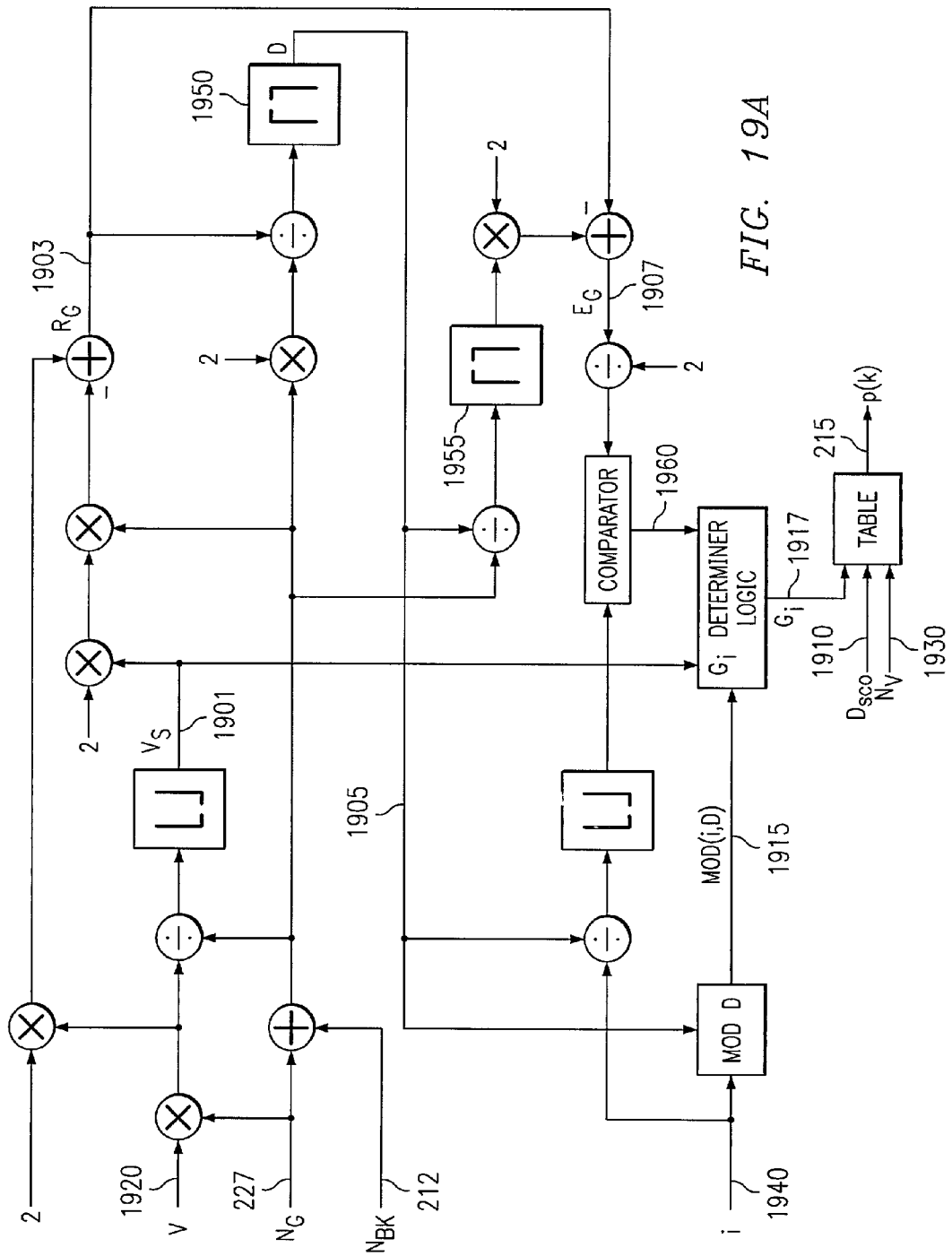
FIG. 19A illustrates the partition sequence generator of FIG. 19 in more detail.

To maintain a proper ratio of the good hopping frequencies to the bad hopping frequencies, 2V$N_G$ good hopping frequencies can be distributed among the ($N_G$+$N_{BK}$) frames. FIG. 19A illustrates exemplary embodiments of the partition sequence generator 220A, including various devices for implementing Equations 11-15 below. Before the good hopping frequencies can be distributed, the number of voice streams $V_s$ 1901 that can be supported (i.e., by using a good hopping frequency on each slot where a voice packet needs to be transmitted) can be determined using the following relationship:

$$V_s = \left\lfloor \frac{VN_G}{N_G + N_{BK}} \right\rfloor. \quad \text{(Equation 11)}$$

This result implies that, at minimum, 2$V_s$ good hopping frequencies should be placed in each frame. The number of good hopping frequencies that remain can be given by the following:

$$R_G = 2VN_G - 2V_s(N_G + N_{BK}). \quad \text{(Equation 12)}$$

To ensure the best level of Quality of Service ("QoS") for the ACL traffic, in some embodiments, the $R_G$ (1903) residual good hopping frequencies can be uniformly distributed across the frames. The distance D 1905 between frames that enables even placement of the residual good hopping frequencies can be given by:

$$D = \left\lceil \frac{2(N_G + N_{BK})}{R_G} \right\rceil. \quad \text{(Equation 13)}$$

Ceiling devices ⌈ ⌉ 1950 and 1955 return the next higher integer of their arguments. For example, ⌈3.12⌉ returns a 4. The result of Equation 13 implies that an additional two (2) good hopping frequencies can be assigned to the following frames: $F_0$, $F_D$, $F_{2D}$, etc. In certain cases, it may be possible that a few good hopping frequencies have not yet been placed. The number of unplaced good hopping frequencies, $E_G$ 1907, can be given by:

$$E_G = R_G - 2\left\lceil \frac{(N_G + N_{BK})}{D} \right\rceil. \quad \text{(Equation 14)}$$

A convenient way to distribute these good hopping frequencies is to assign them two at a time to the following frames: $F_1$, $F_{D+1}$, $f_{2D+1}$, etc. until they have all been placed. Therefore, the number of good hopping frequencies, $G_i$ 1917, that are assigned to the i-th frame can be given by:

$$G_i = \begin{cases} 2V_s + 2 & \text{if } \mod(i, D) = 0 \text{ or } (\mod(i, D) = 1 \text{ and } \lfloor i/D \rfloor < E_G/2) \\ 2V_s & \text{otherwise} \end{cases} \quad \text{(Equation 15)}$$

where i 1940 represents the frame number and the signal mod(i, D) 1915 represents the remainder of i divided by D. The comparator of FIG. 19A compares ⌊i/D⌋ to $E_G$/2, and the result 1960 is fed to $G_i$ determiner logic which determines $G_i$ in response to signals 1915, 1901 and 1960.

The bad hopping frequencies can then be used to ensure that 2V hop-frequencies have been assigned to each frame. The exact placement of the good and bad hopping frequencies within a frame depends on the number of voice streams $N_V$ 1930 that are active and the offset $D_{SCO}$ 1910 for the stream. Both $N_V$ 1930 and $D_{SCO}$ 1910 are conventionally available. $D_{SCO}$ 1910 is an SCO parameter that specifies the offset for an SCO stream. For example, HV1 traffic implies that a voice packet is transmitted in each slot. The master transmits on every other slot, starting with an even slot, while the slave transmits on every other slot, starting with an odd slot. In this case, $D_{SCO}$ is always zero (0). For one (1) HV2 stream with $D_{SCO}$=0 (zero offset), the master transmits on an even slot, the slave transmits on an odd, then the next two (2) slots are idle. After the idle slots, the process starts again. Therefore, for HV2 with $D_{SCO}$=0, there are always two (2) packets transmitted, then two (2) idle slots, then two (2) packets, etc. For one (1) HV2 stream with $D_{SCO}$=2 (offset by 2 slots), the system starts with two (2) idle slots, followed by the master transmitting a packet, followed by the slave transmitting a packet. In this case, the process starts with two (2) idle slots, followed by two (2) packets, followed by two (2) idle slots. When comparing these two (2) HV2 streams, it can be seen that the slots in which the packets are transmitted are always different. In a sense, these two (2) streams are orthogonal. Therefore, it is possible to have two (2) HV2 streams transmitted simultaneously. There can be an HV2 stream with $D_{SCO}$=0 and one with $D_{SCO}$=2. It is also possible to have three (3) HV3 streams all at the same time with $D_{SCO}$=0, 2 and 4.

FIGS. 8, 9 and 10 (in each of which "x" indicates "don't care") illustrate exemplary partition sequences of entire frames for HV1, HV2 and HV3 streams, respectively.

By exploiting the fact that the partition sequence needs to be generated only once per frame (4 slots for HV2 and 6 slots for HV3), the complexity of partition sequence generator 220A (FIG. 19) can be reduced. Partition sequence generator 220A can be designed to work with a single HV1, HV2, or HV3 stream as well as multiple HV2 and HV3 streams. Additionally, the look-up table for the HV1 stream (FIG. 8) can be eliminated and replaced by the entries for two (2) HV2 streams (FIG. 9), because two (2) HV2 streams are equivalent to a single HV1 stream.

A partition sequence generator, such as partition sequence generator 220A (FIGS. 19 and 19A), can generate a partition sequence for an SCO connection, such as partition sequence 700 (FIG. 7) by following the exemplary steps summarized in the flow charts of FIGS. 11, 12A and 12B. A check can be made in decision point 1110 to determine if $N_G \geq N_{min}$. If $N_G \geq N_{min}$ is true in decision point 1110, then conventional reduced adaptive frequency hopping (i.e., assigning a "1" to all windows or p(k)=1 for all windows) can be used in block 1120. As long as $N_G \geq N_{min}$ remains true, the conventional reduced adaptive frequency hopping of block 1120 can continue. If, however, $N_G \geq N_{min}$ is false in decision point 1110, then structured adaptive frequency hopping in block 1130 can be used. The structured adaptive frequency hopping in block 1130 includes two (2) main steps: first, initialize in block 1140 and then determine the partition sequence for each frame (see also FIG. 7) in block 1160. An exemplary block 1140 initialize procedure determines in block 1143 the number of voice streams $V_s$ that can be supported (Equation 11), and an initial number of good hopping frequencies to be placed in each frame. The number of good hopping frequencies remaining $R_G$ (Equation 12) is determined in block 1145, and the remaining good hopping frequencies are distributed in block 1148. An exemplary block 1148 distribution is illustrated in FIG. 12A and can include determining in block 1247 the distance D (Equation 13) between frames to enable even placement of each residual good hopping frequency, determining in block 1251 the number of unplaced good hopping frequencies $E_G$ (Equation 14), and determining $G_i$ (Equation 15) in block 1263. The results of the block 1140 initialize can then be used in block 1160 to determine the partition sequence for each frame. An exemplary procedure for implementing block 1160 is illustrated in FIG. 12B and can include using at 1265 a look-up table, such as those shown in FIGS. 8-10, to assign partition sequence p(k) 215 to each frame.

Figure 13:
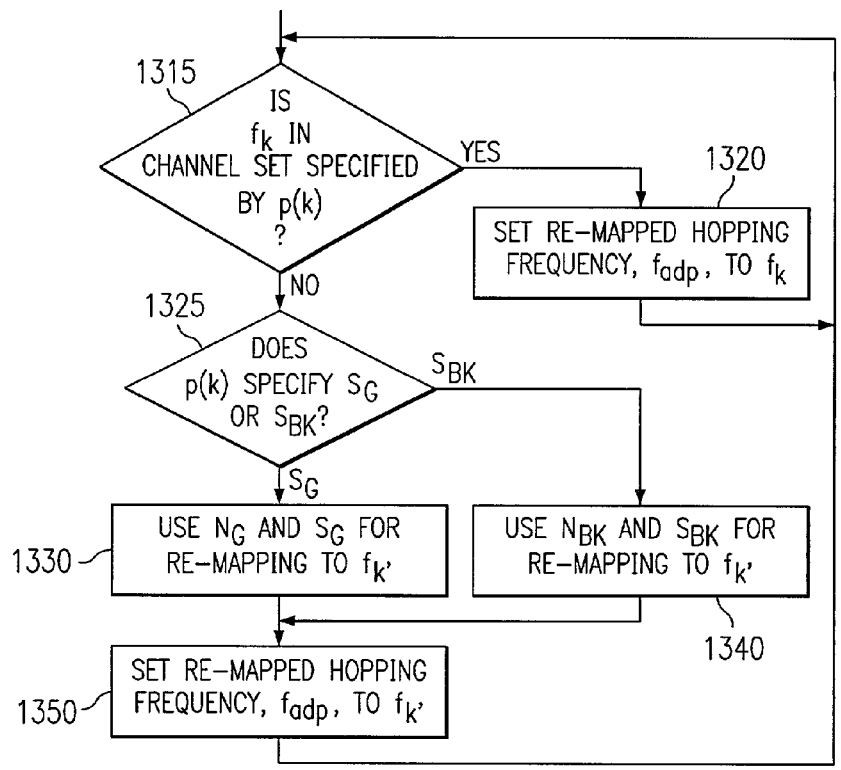
FIG. 13 illustrates an exemplary flow chart for re-mapping the hopping frequency in accordance with an exemplary embodiment of the present invention.

With reference to FIG. 2, the basic principle behind Frequency Re-Mapper 210 is to re-map the hop-frequency $f_k$ 115 produced by Legacy Hop Kernel 110 uniformly onto a frequency of the set (either $S_G$ or $S_{BK}$) defined by partition sequence p(k) 215. If legacy hop-frequency $f_k$ 115 is already in the set (either $S_G$ or $S_{BK}$) specified by partition sequence p(k) 215, then output $f_{adp}$ 213 of Frequency Re-Mapper 210 is legacy hop-frequency $f_k$ 115. If legacy hop-frequency $f_k$ 115 is not in the set (either $S_G$ or $S_{BK}$) specified by partition sequence p(k) 215, then legacy hop-frequency $f_k$ 115 is re-mapped. FIG. 13 illustrates exemplary hopping frequency re-mapping operations in accordance with the present invention. A check can be made in decision point 1315 to determine if $f_k$ 115 is in the specified set. If $f_k$ 115 is in the specified set, then adapted hop-frequency $f_{adp}$ 213 (FIG. 2) can be set to $f_k$ 115 in block 1320. The present invention can then return to decision point 1315 with the next hopping frequency. If $f_k$ 115 is not in the specified set, then the present invention can determine at 1325 whether p(k) 215 specifies a set of good channels, $S_G$, or a set of bad channels, $S_{BK}$. If p(k) 215 specifies a set of good channels, $S_G$, the present invention can use $N_G$ and $S_G$ at 1330 to re-map $f_k$ 115 to $f_k'$. The adapted hop-frequency $f_{adp}$ 213 (FIG. 2) is then set to $f_k'$ in block 1350. The re-mapping at 1330 can include adding a pseudo-random signal to $f_k$ 115.

If p(k) 215 specifies a set of bad channels $S_{BK}$ at 1325, the present invention can use $N_{BK}$ and $S_{BK}$ at 1340 to re-map $f_k$ 115 to $f_k'$. The adapted hop-frequency $f_{adp}$ 213 (FIG. 2) is then set to $f_k'$ in block 1350. The re-mapping at 1340 can include adding a pseudo-random signal to $f_k$ 115.

Figure 14:
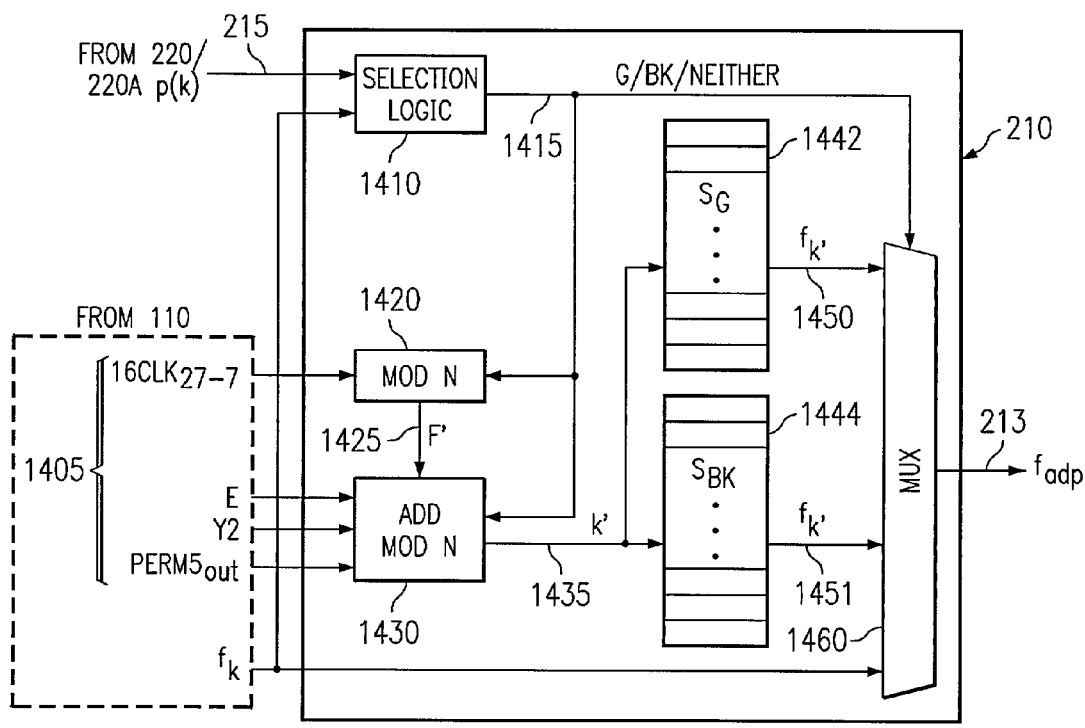
FIG. 14 illustrates a block diagram of re-mapping a hop-frequency in accordance with an exemplary embodiment of the present invention.

The operations of FIG. 13 can be performed by the exemplary frequency re-mapper embodiment of FIG. 14. In FIG. 14, either Partition Sequence Generator 220 (FIG. 2) or 220A (FIG. 19) provides p(k) 215 to selection logic 1410, while Legacy Hop Kernel 110 (FIG. 2) supplies legacy hop-frequency $f_k$ 115 (such that $f_k \in [0, \ldots, 78]$) and other parameters 1405 (e.g., conventionally available Bluetooth signals $16CLK_{27-7}$, E, Y2 and $PERM5_{out}$) that may be required by the re-mapping function. In response to p(k) 215 and $f_k$ 115, selection logic 1410 uses G/BK/Neither signal 1415 to indicate whether $f_k$ 115 should be re-mapped to a good channel (G), a bad channel (BK) or whether no re-mapping is needed (Neither) (see also 1315 and 1325 in FIG. 13). In the exemplary embodiment of FIG. 14, mod N operator 1420 performs the calculation of $16CLK_{27-7}$ mod N, (N=$N_G$ if signal 1415 indicates G, N=$N_{BK}$ if signal 1415 indicates BK) where, in a Bluetooth embodiment, $16CLK_{27-7}$ mod N (27 bits through 7 bits, selected in that order, for the variable CLK, such as master clock 103 in FIGS. 1 and 2) indicates the connection state used to determine mapping onto the hop frequencies (conventionally referenced as F), resulting in F' 1425. Then, mod N adder 1430 performs the calculation of ($PERM5_{out}$+ E+F'+Y2)mod N, where, in a Bluetooth embodiment, E is an input used to determine mapping onto the hop frequencies, Y2 is an input that selects the slave-to-master transmission and $PERM5_{out}$ is the result of a conventionally performed hop selection kernel permutation operation. The result is k' 1435, which is an index into mapping tables 1442 and 1444. Mapping table 1442 includes only good channels from the set of good channels, $S_G$, where the even good channels can be listed in ascending order, followed by the odd good channels listed in ascending order and the other mapping table 1444 includes only bad channels from the set of bad channels, $S_{BK}$, where the even bad channels can be listed in ascending order, followed by the odd bad channels listed in ascending order. The channels from mapping tables 1442 and 1444 that correspond to k' 1435 can be output as $f_k'$ 1450 and $f_k'$ 1451 (such that $f_k' \in [0, \ldots, 78]$ for Bluetooth embodiments) to MUX 1460. Signal 1415 tells MUX 1460 whether to output $f_k$ 115 ("Neither") or $f_k'$ 1450 ("G") or $f_k'$ 1451 ("BK") as $f_{adp}$ 213.

In other exemplary embodiments, the k' index for tables 1442 and 1444 of FIG. 14 is produced by modulo N addition of $f_k$ and a random value $R_k$, as shown at 1430A in FIG. 18.

FIG. 15 illustrates a table of exemplary Bluetooth channel sets as set forth below:

$S_G = [0, 2, \ldots, 38, 1, 3, \ldots, 39](N_G = 40)$, $S_{BK} = [40, 42, \ldots, 58, 41, 43, \ldots, 59](N_{BK} = 20)$, and $S_{BN} = [60, 62, \ldots, 78, 61, 63, \ldots, 77](N_{BN} = 19)$, in which $S_{BN}$ represents the set of bad channels that are not used in the adapted hopping sequence and $N_{BN}$ represents the number of bad channels that are not used in the adapted hopping sequence. Assume that the beginning index for each set is 0. The sets $S_G$, $S_{BK}$, and $S_{BN}$ as listed above are ordered according to the Bluetooth 1.1 standard (i.e, even channels listed in ascending order, followed by odd channels listed in ascending order). FIGS. 16 and 17 (in each of which "-" indicates "don't care") illustrate exemplary re-mapped hopping sequences produced by Frequency Re-Mapper 210 and the channel sets shown in FIG. 15 in accordance with the exemplary embodiments of FIG. 18, for example a Bluetooth embodiment.

FIG. 16 illustrates an exemplary re-mapped hopping sequence for $N_{min} = 60$, in which bad channels $N_{BK}$ from $S_{BK}$ must be used in the new hopping sequence because $N_{min} > N_G$. When $f_k$ is a channel that is included in the set specified by p(k), no re-mapping is necessary ($f_{adp} = f_k$), and signal 1415="Neither" in FIG. 14. This is illustrated in several cases in FIG. 16. For example, when p(k)=1, it can specify the set of good channels, $S_G$. Therefore, if $f_k$=1, no re-mapping is necessary because 1 is in the set of good channels, $S_G$ (index 20 of FIG. 15). Additionally, when p(k)=0, it can specify the set of bad channels, $S_{BK}$. Therefore, if $f_k$=42, no re-mapping is necessary because 42 is in the set of bad channels, $S_{BK}$ (index 1 of FIG. 15). However, when $f_k$ is a channel that is not included in the set specified by p(k), re-mapping is necessary. This is also illustrated in several cases in FIG. 16. Again, when p(k)=1, it can specify the set of good channels, $S_G$. Therefore, if $f_k$=49, which is in the set of bad channels, $S_{BK}$ (index 14 of FIG. 15), or if $f_k$=64, which is in the set of bad channels not used, $S_{BN}$ (index 2 of FIG. 15), re-mapping can be performed. In the exemplary embodiment of FIG. 16, $f_k$ can be re-mapped by adding $R_k$ to $f_k$ mod N, where $N=N_G$ or $N_{BK}$ as determined by logic 1410 of FIG. 14. The addition result can be used as an index into a table, such as shown in FIGS. 14 and 15, to select the channel for $f_{adp}$. Using the example of $f_k=49$ given above, and with p(k)=1 (specifying the set of good channels, $S_G$), then N can be set to 40 ($N_G=40$). Next, with $R_k=16$, the calculation (49+16)mod40 can be performed, the result of which is 25. Therefore, 25 can be used as an index into the table of FIG. 15 (i.e., k' in FIG. 14) in order to select a channel from the set of good channels, $S_G$, for $f_{adp}$. In this example, index 25 of FIG. 15 indicates that $f_{adp}$ should be set to 11. Similar re-mapping can be performed when p(k)=0 and $f_k$ is not in the set of bad channels, $S_{BK}$. In this case, N can be set to 20 since $N_{BK}=20$ and the resultant k' value can be used to select a channel from the set of bad channels, $S_{BK}$, in FIG. 15 (or FIG. 14).

FIG. 17 illustrates an exemplary re-mapped hopping sequence for $N_{min}=36$, in which only good channels from $S_G$ need be used in the new hopping sequence because $N_{min}<N_G$. Re-mapping calculations as described with reference to FIG. 16 can be applied in FIG. 17. The difference is that p(k) will always equal 1, therefore N will always equal $N_G$ and the resultant k' value can be used to select a channel from only the set of good channels, $S_G$, in FIG. 15 (or FIG. 14).

It will be evident to workers in the art that the exemplary embodiments described above with respect to FIGS. 2-19A can be readily implemented by suitable modifications in software, hardware or a combination of software and hardware in conventional wireless communication devices, for example Bluetooth devices.

Although exemplary embodiments of the present invention have been described in detail, it will be understood by those skilled in the art that various modifications can be made therein without departing from the spirit and scope of the invention as set forth in the appended claims.

What is claimed is:

1. An apparatus for generating a structured adaptive frequency hopping sequence for use in frequency channel communications over a time division multiplexed wireless communication link, the structured adaptive frequency hopping sequence including a first group of frequencies that meet a predetermined qualification criterion and a second group of frequencies that fail to meet the predetermined qualification criterion, comprising:
    a partition sequence generator for providing first information indicative of time slots of the wireless communication link that use frequencies from the first group and time slots of the wireless communication link that use frequencies from the second group, said partition sequence generator including an input for receiving second information indicative of a characteristic of a communication protocol associated with the wireless communication link, said partition sequence generator for providing said first information based on said second information; and
    a frequency mapper coupled to said partition sequence generator and responsive to said first information for producing third information indicative of the structured adaptive frequency hopping sequence wherein the partition sequence generator provides the first information by determining a first bad window size and a last bad window size, the first bad window size being larger than the last bad window size.

2. The apparatus of claim 1 wherein said partition sequence generator includes a first device coupled to said input for determining in response to said second information a first number of consecutive time slots that use frequencies from the second group.

3. The apparatus of claim 2 wherein said partition sequence generator includes a second device coupled to said first device for determining in response to said first number of consecutive time slots a second number of consecutive time slots that use frequencies from the second group.

4. The apparatus of claim 2 wherein said partition sequence generator includes a second device coupled to said first device for determining in response to said first number of consecutive time slots a second number of consecutive time slots that use frequencies from the first group.

5. The apparatus of claim 4 wherein said partition sequence generator includes a third device coupled to said second device for determining in response to said second number of consecutive time slots a third number of consecutive time slots that use frequencies from the first group.

6. The apparatus of claim 4 wherein said first information indicates that said first and second numbers of consecutive time slots are repeated in a temporally alternating sequence.

7. The apparatus of claim 1 wherein the characteristic of the communication protocol includes a timeout value associated with the wireless communication link.

8. The apparatus of claim 1 wherein the predetermined qualification criterion includes an interference level.

9. A wireless communication apparatus for use in frequency channel communications over a time division multiplexed wireless communication link, comprising:
    a frequency hopping sequence generator for generating a structured adaptive frequency hopping sequence for use in transmitting a plurality of information streams on frequency channels of said wireless communication link, wherein at least a first of said plurality of information streams is more susceptible to interference than another of said plurality of information streams, the structured adaptive frequency hopping sequence including a first group of frequencies that meet a predetermined qualification criterion and a second group of frequencies that fail to meet the predetermined qualification criterion;
    said frequency hopping sequence generator including a partition sequence generator for providing first information indicative of time slots of the wireless communication link that use frequencies from the first group and time slots of the wireless communication link that use frequencies from the second group, said partition sequence generator including an input for receiving second information indicative of a number of said first information streams that can be supported by the wireless communication link if only frequencies from the first group are used to transmit the first information streams, said partition sequence generator for providing said first information based on said second information;
    said frequency hopping sequence generator including a frequency mapper coupled to said partition sequence generator and responsive to said first information for producing third information indicative of the structured adaptive frequency hopping sequence wherein said frequency mapper produces said third information by selectively choosing between a reduced adaptive hopping sequence having only good channels and an adaptive hopping sequence having good channels and bad channels; and
    a wireless communication interface coupled to said frequency mapper for interfacing between said wireless communication link and a communication application, said wireless communication interface for communicating data associated with said communication application on frequency channels of the wireless communication link specified by said third information.

10. The apparatus of claim 9 provided as one of a mobile telephone, a laptop computer and a personal digital assistant.

11. The apparatus of claim 9 provided as a Bluetooth apparatus.

12. The apparatus of claim 11 wherein said at least a first information stream is a voice stream.

13. A method for generating a structured adaptive frequency hopping sequence for use in frequency channel communications over a time division multiplexed wireless communication link, the structured adaptive frequency hopping sequence including a first group of frequencies that meet a predetemined qualification criterion and a second group of frequencies that fail to meet the predetermined qualification criterion, the method comprising:

providing first information indicative of a characteristic of a communication protocol associated with the wireless communication link;

in response to said first information, providing second information indicative of time slots of the wireless communication link that use frequencies from the first group and time slots of the wireless communication link that use frequencies from the second group; and in response to said second information, providing third information indicative of the structured adaptive frequency hopping sequence, wherein providing said third information comprises selectively choosing between a reduced adaptive hopping sequence having only good channels and an adaptive hopping sequence having good channels and bad channels.

14. The method of claim 13 wherein said second-mentioned providing includes determining in response to said first information a first number of consecutive time slots that use frequencies from the second group.

15. The method of claim 14 wherein said second-mentioned providing includes determining in response to said first number of consecutive time slots a second number of consecutive time slots that use frequencies from the first group.

16. The method of claim 15 wherein said second information indicates that said first and second numbers of consecutive time slots are repeated in a temporally alternating sequence.

* * * * *